United States Patent
Kim et al.

(10) Patent No.: US 10,606,257 B2
(45) Date of Patent: Mar. 31, 2020

(54) AUTOMATIC PARKING SYSTEM AND AUTOMATIC PARKING METHOD

(71) Applicants: HYUNDAI MOTOR COMPANY, Seoul (KR); KIA MOTORS CORPORATION, Seoul (KR)

(72) Inventors: Yoon Soo Kim, Suwon-si (KR); Dae Joong Yoon, Hwaseong-si (KR); Seung Wook Park, Yongin-si (KR); Jae Seob Choi, Suwon-si (KR); Min Byeong Lee, Seongnam-si (KR); Jong Gyu Kim, Incheon (KR); In Yong Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/833,281

(22) Filed: Dec. 6, 2017

(65) Prior Publication Data

US 2018/0107207 A1   Apr. 19, 2018

Related U.S. Application Data (63) Continuation-in-part of application No. 15/014,646, filed on Feb. 3, 2016, now Pat. No. 10,384,719.

(30) Foreign Application Priority Data

Nov. 10, 2015 (KR) .......................... 10-2015-0157406
Dec. 30, 2016 (KR) .......................... 10-2016-0184292

(51) Int. Cl.
  *G05D 1/00* (2006.01)
  *B62D 15/02* (2006.01)
  (Continued)

(52) U.S. Cl.
  CPC ........... *G05D 1/0016* (2013.01); *B60W 30/06* (2013.01); *B62D 15/0285* (2013.01);
  (Continued)

(58) Field of Classification Search
  CPC .. G05D 1/0016; G05D 1/0044; G05D 1/0231; B62D 15/028; G06K 9/00812;
  (Continued)

(56) References Cited

U.S. PATENT DOCUMENTS 6,571,193 B1   5/2003   Unuma et al.
7,202,775 B2   4/2007   Yezersky et al.
(Continued)

FOREIGN PATENT DOCUMENTS

JP   2006-044484 A   2/2006
JP   2008-174192 A   7/2008
(Continued)

OTHER PUBLICATIONS

Office Action issued in corresponding Korean Application. No. 10-2015-0157406, dated Nov. 9, 2016.
(Continued)

*Primary Examiner* — Angelina Shudy
(74) *Attorney, Agent, or Firm* — Morgan, Lewis & Bockius LLP (57) ABSTRACT

There is provided an automatic parking system according to an exemplary embodiment of the present disclosure. The automatic parking system includes: a smart key recognition processor recognizing a smart key positioned in a first area; a sensor unit acquiring images around a subject vehicle if the smart key is recognized, and converting the acquired image into external images and synthesizing the images; a parking space recognizing sensor periodically receiving the external images and sequentially comparing the consecutive external images using an image recognition technology to recognize
(Continued)

parking areas; and a controller calculating a moving path between a current position of the subject vehicle and an optimal parking area among the parking areas and controlling the subject vehicle based on the moving path, in which the parking space recognizing sensor may detect the parking areas in consideration of a length and a width of the subject vehicle.

15 Claims, 10 Drawing Sheets

(51) Int. Cl.
```
G08G 1/16      (2006.01)
G08G 1/14      (2006.01)
G06K 9/00      (2006.01)
G06K 9/62      (2006.01)
G05D 1/02      (2020.01)
B60W 30/06     (2006.01)
```
(52) U.S. Cl.
CPC ......... *G05D 1/0044* (2013.01); *G05D 1/0231* (2013.01); *G06K 9/00812* (2013.01); *G06K 9/6202* (2013.01); *G08G 1/14* (2013.01); *G08G 1/168* (2013.01); *B60Y 2400/3015* (2013.01)

(58) Field of Classification Search
CPC .......... G06K 9/6202; G08G 1/14; G08G 1/16; B60Y 2400/3015
USPC ........................................................... 701/2
See application file for complete search history.

(56) References Cited

U.S. PATENT DOCUMENTS

| | | | |
|---|---|---|---|
| 7,551,980 B2 | 6/2009 | Sakagami et al. | |
| 7,643,913 B2 | 1/2010 | Taki et al. | |
| 8,218,816 B2* | 7/2012 | Sonoura | G06K 9/32 |
| | | | 382/103 |
| 8,392,065 B2 | 3/2013 | Tolstedt et al. | |
| 9,073,484 B2 | 7/2015 | Aimura et al. | |
| 9,451,447 B2 | 9/2016 | Tibbitts et al. | |
| 9,696,813 B2 | 7/2017 | Chiu | |
| 9,731,714 B2 | 8/2017 | Kiriya | |
| 9,772,193 B1 | 9/2017 | Mendelson | |
| 9,789,904 B2 | 10/2017 | Jecker et al. | |
| 10,384,718 B1* | 8/2019 | Kentley-Klay | B62D 15/028 |
| 10,392,009 B2* | 8/2019 | Kim | B60W 10/10 |
| 10,449,955 B2* | 10/2019 | Kim | B60W 30/06 |
| 2006/0192650 A1* | 8/2006 | Shinada | B60R 25/24 |
| | | | 340/5.2 |
| 2008/0101656 A1* | 5/2008 | Barnes | G08G 1/017 |
| | | | 382/104 |
| 2010/0063680 A1 | 3/2010 | Tolstedt et al. | |
| 2010/0250022 A1 | 9/2010 | Hines et al. | |
| 2011/0026770 A1 | 2/2011 | Brookshire | |
| 2011/0170748 A1 | 7/2011 | Aimura et al. | |
| 2012/0316704 A1* | 12/2012 | Ohbayashi | B60R 25/04 |
| | | | 701/2 |
| 2012/0320206 A1 | 12/2012 | Sim et al. | |
| 2013/0099892 A1 | 4/2013 | Tucker et al. | |
| 2013/0151036 A1 | 6/2013 | Harumoto et al. | |
| 2013/0162825 A1* | 6/2013 | Yoon | B60W 30/06 |
| | | | 348/148 |
| 2013/0229524 A1* | 9/2013 | Vovkushevsky | B60R 1/00 |
| | | | 348/148 |
| 2013/0265428 A1 | 10/2013 | Yoon et al. | |
| 2013/0268144 A1 | 10/2013 | Du et al. | |
| 2013/0316704 A1 | 11/2013 | Home | |
| 2014/0333455 A1 | 11/2014 | Lee | |
| 2014/0348380 A1 | 11/2014 | Yoon et al. | |
| 2014/0365032 A1 | 12/2014 | Park et al. | |
| 2015/0088360 A1 | 3/2015 | Bonnet et al. | |
| 2015/0127208 A1 | 5/2015 | Jecker et al. | |
| 2015/0138011 A1* | 5/2015 | Hiramaki | G01S 13/931 |
| | | | 342/118 |
| 2015/0203111 A1* | 7/2015 | Bonnet | B62D 15/027 |
| | | | 701/25 |
| 2015/0279131 A1 | 10/2015 | Nespolo | |
| 2015/0329110 A1* | 11/2015 | Stefan | B62D 15/0285 |
| | | | 701/1 |
| 2015/0367846 A1 | 12/2015 | Sans | |
| 2015/0375741 A1 | 12/2015 | Kiriya | |
| 2015/0375742 A1* | 12/2015 | Gebert | B62D 15/027 |
| | | | 701/23 |
| 2016/0018822 A1 | 1/2016 | Nevdahs et al. | |
| 2016/0068158 A1* | 3/2016 | Elwart | B60W 10/00 |
| | | | 701/41 |
| 2016/0114728 A1* | 4/2016 | Tan | B60R 1/00 |
| | | | 348/148 |
| 2016/0114798 A1 | 4/2016 | Kim et al. | |
| 2016/0121849 A1* | 5/2016 | Kim | G07C 9/00007 |
| | | | 701/2 |
| 2016/0188977 A1 | 6/2016 | Kearns et al. | |
| 2016/0207526 A1* | 7/2016 | Franz | G06K 9/00812 |
| 2016/0304087 A1* | 10/2016 | Noh | B60W 30/06 |
| 2016/0304198 A1 | 10/2016 | Jourdan | |
| 2017/0019480 A1 | 1/2017 | Yokota et al. | |
| 2017/0061813 A1 | 3/2017 | Tao et al. | |
| 2017/0309183 A1 | 10/2017 | Nordbruch et al. | |
| 2017/0329329 A1 | 11/2017 | Kamhi et al. | |
| 2018/0022329 A1 | 1/2018 | Sannodo | |
| 2018/0029591 A1 | 2/2018 | Lavoie | |
| 2018/0037262 A1 | 2/2018 | Imai | |
| 2018/0039264 A1 | 2/2018 | Messner et al. | |
| 2018/0082588 A1 | 3/2018 | Hoffman, Jr. et al. | |
| 2018/0086381 A1* | 3/2018 | Hoffman, Jr. | B62D 15/0285 |
| 2018/0105167 A1* | 4/2018 | Kim | B60W 30/06 |
| 2018/0105208 A1* | 4/2018 | Kim | B62D 15/0285 |
| 2018/0144622 A1 | 5/2018 | Gage et al. | |
| 2018/0107207 A1 | 7/2018 | Kim et al. | |
| 2018/0186365 A1* | 7/2018 | Kim | B60W 40/10 |
| 2018/0186407 A1* | 7/2018 | Kim | G06K 9/00812 |
| 2018/0334164 A1* | 11/2018 | Stefan | G06K 9/00812 |
| 2019/0329761 A1* | 10/2019 | Kim | B60W 10/18 |

FOREIGN PATENT DOCUMENTS

| | | |
|---|---|---|
| JP | 2010-095027 A | 4/2010 |
| JP | 2012-216079 A | 11/2012 |
| JP | 2013-123096 A | 6/2013 |
| JP | 2013-241088 A | 12/2013 |
| JP | 2015-001778 A | 1/2015 |
| JP | 2015-035181 A | 2/2015 |
| JP | 2015-111386 A | 6/2015 |
| JP | 2016-185745 A | 10/2016 |
| KR | 10-2013-0073256 A | 7/2013 |
| KR | 10-2013-0085235 A | 7/2013 |
| KR | 10-2014-0028724 A | 3/2014 |
| KR | 10-1426468 B1 | 8/2014 |
| KR | 10-2014-0142993 A | 12/2014 |
| KR | 10-2015-0006270 A | 1/2015 |
| KR | 10-1532320 B1 | 7/2015 |
| KR | 10-2016-0123119 A | 10/2016 |

OTHER PUBLICATIONS

Non-Final Office Action issued in corresponding parent U.S. Appl. No. 15/014,646, dated Sep. 8, 2017.

Korean Office Action issued in corresponding Korean Patent Application No. 10-2016-0184292, dated Feb. 8, 2018, with English Translation.

Office Action issued in related U.S. Appl. No. 15/014,646 dated Sep. 11, 2018.

Extended Search Report issued in related European application No. 17205261.5, dated May 29, 2018.

* cited by examiner

AUTOMATIC PARKING SYSTEM AND AUTOMATIC PARKING METHOD

CROSS-REFERENCE TO RELATED APPLICATION(S)

This application is a Continuation-In-Part of U.S. patent application Ser. No. 15/014,646, filed on Feb. 3, 2016, which is based on and claims priority to and the benefit of Korean Patent Application No. 10-2016-0184292, filed on Dec. 30, 2016 and Korean Patent Application No. 10-2015-0157406, filed on Nov. 10, 2015 with the Korean Intellectual Property Office, the disclosures of which are incorporated herein by reference in their entireties.

BACKGROUND OF THE DISCLOSURE

Field of the Disclosure

Exemplary embodiments of the present disclosure relate to automatic parking, and more particularly, to an automatic parking system and an automatic parking method that uses detection of a parking area.

Description of the Related Art

The automatic parking system is a system capable of enabling an inexperienced driver poor at parking to conveniently park his/her vehicle, in which when parking a vehicle, a driver determines a position of an obstacle by using a camera or an ultrasonic sensor attached to a rear portion of the vehicle, and selects parallel parking or perpendicular parking, then the automatic parking system performs a predetermined operation.

In particular, in a case of an automatic parking system using a camera, once the driver selects a parking position while checking a rear visual field through a monitor and finally selects parking of the vehicle, the automatic parking system automatically controls a steering wheel of the vehicle using a sensor value, thereby safely parking the vehicle. Further, a parking area may be set in advance through the camera and a sensor, and the automatic parking system performs automatic parking through data obtained by the camera and the sensor. At this point, the camera may sense all of a front area, a rear area, and a side area and be implemented by around view monitoring (AVM).

In general, the AVM system provides only the function of displaying images around the vehicle to a driver, and the driver does not get help for parking because he and she directly needs to determine a parking condition from the images provided through the AVM system.

SUMMARY OF THE DISCLOSURE

An object of the present disclosure is to provide an automatic parking system that may perform automatic parking by setting an optimal parking area through a sensor, and an automatic parking method.

Another object of the present disclosure is to provide an automatic parking system that obtains an image around a vehicle using a plurality of cameras installed in the vehicle, converts the obtained image to recognize an available parking area, and provides a driver with a moving path corresponding to the parking area, and an automatic parking method.

Still another object of the present disclosure is to provide an automatic parking system for remote parking of a vehicle using a smart key, and an automatic parking method.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

There is provided an automatic parking system an automatic parking system, including: a smart key recognition processor recognizing a smart key positioned in a first area; a sensor unit acquiring images around a subject vehicle if the smart key is recognized, and converting the acquired image into external images and synthesizing the external images; a parking space recognizing sensor periodically receiving the external images and sequentially comparing consecutive external images using an image recognition technology to recognize parking areas; and a controller calculating a moving path between a current position of the subject vehicle and an optimal parking area among the parking areas and controlling the subject vehicle based on the moving path, in which the parking space recognizing sensor may detect the parking areas in consideration of a length and a width of the subject vehicle.

The parking space recognizing sensor may extract feature points of the consecutive images using the image recognition technology, match the feature points of the consecutive images, delete mismatched feature points, and match valid feature points to recognize the parking areas.

The controller may control the subject vehicle to prevent the subject vehicle from colliding with obstacles using data acquired by the sensor processor and the camera processor, while the subject vehicle moves along the moving path.

The smart key may perform an automatic parking mode control to perform a start control and an automatic parking of the subject vehicle within a second area and the second area may be an area larger than the first area.

The automatic parking mode may be released by using the smart key.

The sensor unit may detect surrounding parking around the optimal parking area and a parking line.

The automatic parking system may further include: a display controller informing a driver of the parking areas, in which the controller may control the vehicle to be driven in the optimal parking area selected by the driver.

The controller may control steering, acceleration, brake, gear shift, and parking brake of the subject vehicle.

The external images may be top view images of the subject vehicle viewed from a top of the subject vehicle.

There is provided an automatic parking system an automatic parking method for automatically parking a subject vehicle, the automatic parking method including: activating an automatic parking mode by recognizing a smart key position in a first area; setting the automatic parking mode; detecting parking areas using external images around the subject vehicle and a length and a width of the subject vehicle; selecting an optimal parking area among the parking areas; and automatically parking the subject vehicle in the optimal parking area, in which in the detecting of the parking areas, the parking areas may be recognized by sequentially comparing consecutive external images using an image recognition technology.

The automatic parking method may further include: terminating the automatic parking mode, after the automatically parking of the subject vehicle, in which the terminating of the automatic parking mode may be performed by turning off an automatic parking mode switch or shifting a gear to parking.

In the automatically parking of the subject vehicle, when an automatic parking mode switch is turned off or a gear is shifted to parking, the automatic parking mode may be terminated.

The automatic parking method may further include: terminating the automatic parking mode, after the automatically parking of the subject vehicle, in which when a button of the smart key is in an on state, the subject vehicle may be automatically parked, and when the button of the smart key is in an off state, the automatic parking mode may be terminated.

In the automatically parking of the subject vehicle, when any one of gear shift, steering change, and brake operation is performed, the automatic parking mode may be stopped.

The detecting of the parking areas may include: extracting feature points of the consecutive images using the image recognition technology; deleting mismatched feature points by matching the feature points of the consecutive images; and matching images based on valid feature points.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, embodiments of the present disclosure will be described in detail with reference to the accompanying drawings so that those skilled in the art may easily practice the present disclosure. However, the present disclosure may be implemented in various different forms and is not limited to the embodiments provided in the present description.

Portions unrelated to the description are omitted in order to obviously describe the present disclosure, and components that are the same as or similar to each other will be denoted by the same reference numerals throughout the specification.

A case in which any one part is "connected" with the other part includes a case in which the parts are "directly connected" with each other and a case in which the parts are "electrically connected" with each other with other elements interposed therebetween. In addition, unless explicitly described to the contrary, "comprising" any components will be understood to imply the inclusion of other elements rather than the exclusion of any other elements.

When it is described that any one part is "on" the other part, it may mean that the part is directly on the other part or any other part is interposed therebetween. On the contrary, when it is described that any one part is "directly on" the other part, there is no other part interposed therebetween.

Terms "first", "second", "third", and the like are used to describe various parts, components, areas, layers, and/or sections, but are not limited thereto. These terms are used only to distinguish one part, component, area, layer, or section from another part, component, area, layer, or section. Accordingly, a first part, a first component, a first area, a first layer, or a first section to be described below may indicate a second part, a second component, a second area, a second layer, or a second section without departing from the scope of the present disclosure.

Technical terms used herein are merely to describe a specific embodiment, but are not intended to limit the present disclosure. Singular forms used herein include plural forms unless context clearly indicates otherwise. A term "comprising" used in the specification specifies a specific characteristic, area, integer, step, operation, element, and/or component, but does not exclude a presence or an addition of any other characteristic, area, integer, step, operation, element, and/or component.

Terms "below", "above", and the like indicating a relative space may be used to more easily describe a relationship between one part with another part illustrated in the drawings. These terms are intended to include other meanings or operations of a device that is being used, in addition to meanings intended in the drawings. For example, when the device in the drawing is inverted, any part described as being "below" other parts may be described as being "above" the other parts. Therefore, the exemplary term "below" includes both of an upper direction and a lower direction. The device may rotate by 90° or other angles, and the terms indicating a relative space are interpreted according thereto.

Although not defined otherwise, all terms including technical terms and scientific terms used herein have the same meanings as those generally understood by a person having ordinary knowledge in the art to which the present disclosure pertains. Terms defined in a dictionary generally used are additionally interpreted as having a meaning consistent with the related art documents and contents currently disclosed, and unless defined otherwise, are not interpreted as having an ideal or very official meaning.

Hereinafter, embodiments of the present disclosure will be described in detail with reference to the accompanying drawings so as to be easily practiced by a person having ordinary knowledge in the art to which the present disclosure pertains. However, the present disclosure may be implemented in various different forms and is not limited to the embodiments provided in the present description.

Figure 1:
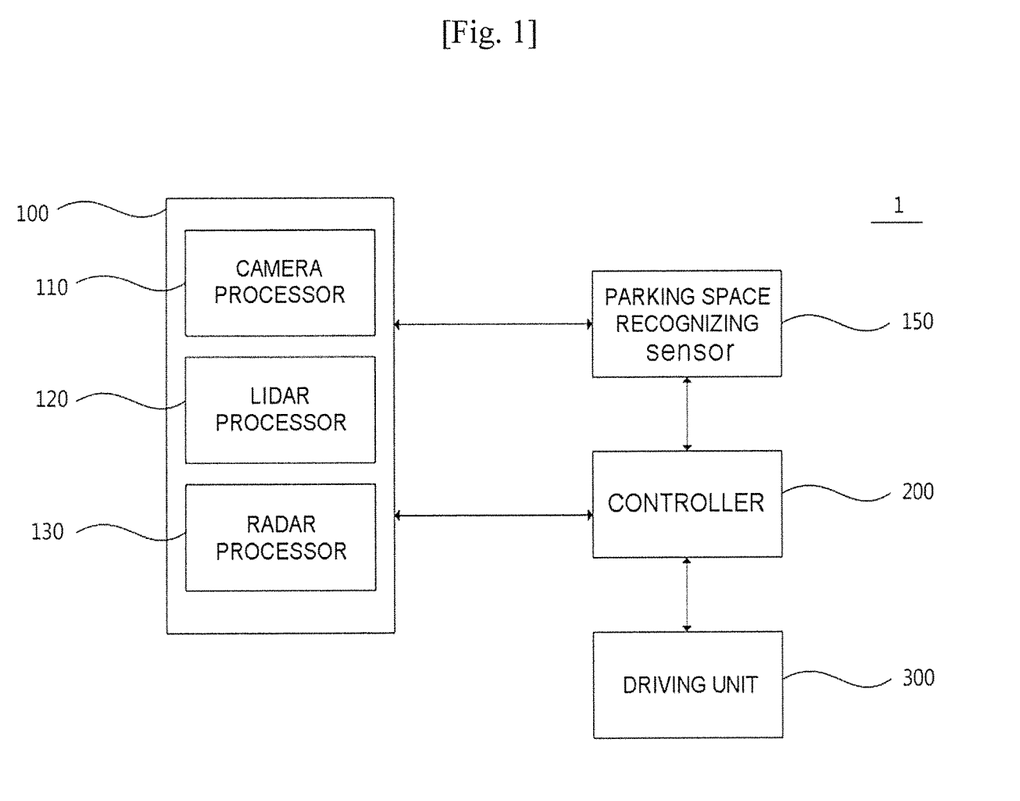
FIG. 1 is a diagram showing components of an automatic parking system according to an exemplary embodiment of the present disclosure.

FIG. 1 is a diagram showing components of an automatic parking system according to an exemplary embodiment of the present disclosure.

Referring to FIG. 1, the automatic parking system 1 may include a sensor unit 100, a parking space recognizing sensor 150, a controller 200, and a driving unit 300. The data acquired by the sensor unit 100 may be transmitted to the parking space recognizing sensor 150 and the controller 200 and the parking space recognizing sensor 150 may calculate the data acquired by the sensor unit 100. The controller 200 may control the driving unit 300 to park the subject vehicle in the parking area calculated by the parking space recognizing sensor 150.

The sensor unit 100 may include a camera processor 110, a Lidar processor 120, and a radar processor 130.

The camera processor 110 may sense a front area, a rear area, and/or a side area of a subject vehicle, and transmit data obtained therethrough to the electrical controller (ECU) level. The camera processor 110 may largely include an image sensor, an image processor, and a camera media controller (MCU). As an example, the image sensor may sense an image of a subject photographed through a lens, the image processor may receive the sensed data from the image sensor and process the received data, and the camera MCU may receive the processed data from the image processor.

For example, the camera processor 110 may include an around view monitoring (AVM) system. The AVM may be implemented by installing a plurality of camera devices for photographing the periphery of the vehicle and acquiring images in all directions of the vehicle. The AVM provides the driver with the images photographed through the plurality of camera devices, thereby securing a field of vision around the subject vehicle and eliminating blind spots that the driver is hard to see.

As another example, the camera processor 110 may acquire data on a preceding vehicle, data on a forward lane, data on a preceding cyclist, data on a traffic sign, data on active high beam control (AHB), data on wheel detection (e.g., data for more rapidly recognizing a vehicle through vehicle wheel recognition with respect to a close cut-in vehicle that comes into a field-of-view (FOV) of a camera), data on a traffic light, data on road marking (e.g., arrow on road), data on vehicle detection (VD) at any angle (data for recognizing a vehicle with respect to all driving directions or angles of the preceding vehicle), data on road profile (e.g., data for improving riding quality through suspension control by recognizing a shape of forward road (unevenness, a speed bump, or a hole)), data on semantic free space (e.g., boundary labeling), data on a general object (neighboring vehicle, etc.), data on advanced path planning (e.g., data for predicting a vehicle driving path by deep learning through surrounding environment even on a road without lane or a contaminated road), data on odometry (e.g., data for combination with recognition information of GPS by recognizing a landmark on a driving road), data on a parking line and data on an interval between vehicles for parking, etc.

The Lidar processor 120 may be connected to a Lidar device which is a sensor, and the Lidar device may sense a front area, a rear area, and a side area of the vehicle. The Lidar device may be configured of a laser transmission module, a laser detection module, a signal collection and processing module, and a data transmission and reception module, and as a light source of a laser, laser light sources with a wavelength in a wavelength range of 250 nm to 11 μm or with variable wavelength may be used. Further, the Lidar device may be classified into a time of flight (TOP) type or a phase shift type according to a signal modulation scheme.

The radar processor 130 may be connected to a radar device which is a sensor to sense an object in the front area, the rear area, and the side area of the vehicle. The radar device may be a sensor device using an electromagnetic wave to measure a distance, a speed, or and angle of an object. When using the radar device, it is possible to sense an object within 150 m in a horizontal angle range of 30 degrees by using a scheme of a frequency modulation carrier wave (FMCW), or a pulse carrier. The radar processor 130 may process data sensed and output by the radar device, and this processing may include magnification of the sensed forward object and focusing on an area of the object in the entire view area.

The Lidar processor 120 and the radar processor 130 may measure a spaced distance between the subject vehicle and the surrounding vehicles or obstacles while the subject vehicle is driving and parking and may transmit data on the spaced distance to the controller 200. The controller 200 may prevent a collision between the subject vehicle and the obstacles based on the data on the spaced distance.

The parking space recognizing sensor 150 may recognize the parking areas in which the subject vehicle may be parked by receiving the images and the data on the spaced distance obtained through the sensor unit 100 including the camera processor 110. The parking space recognizing sensor 150 recognizes the parking space and recognizes a vehicle trajectory by comparing two consecutive images from the images periodically input. At this point, the data on the spaced distance between the subject vehicle and the surrounding vehicles (or obstacles) acquired through the Lidar processor 120 and the Radar processor 130 may help the parking space recognizing sensor 150 to recognize and calculate the parking areas.

A controller 200 is an electrical controller (ECU) belonging to the ECU level, and may be a device integrally controlling multiple electronic devices used in a vehicle. For example, the controller 200 may control all of processors belonging to the processor level and controllers belonging to the controller level. The controller 200 may receive sensing data from the processors, generate a control command controlling a controller in consideration of circumstances, and transmit the control command to the controllers. In the present specification, for convenience of explanation, the ECU level is described as a higher level than the processor level, however, there may be a case in which one of the processors belonging to the processor level serves as an ECU, or a case in which two processors are combined to serve as an ECU.

The driving unit 300 may include a display controller, a steering controller, a drive controller, a brake controller, a gear controller, and the like. Each of the controllers may control components of a vehicle based on the control command received from the controller 200.

The display controller may be configured to provide the driver with information on a specific situation or to warn of a dangerous situation. The display controller may generate an audio signal, a video signal, or a haptic signal for warning of driving situation of the vehicle and dangerous situation. For example, the display controller may output situation explanation and a warning sound in an audio way, and output a message about the situation or a warning message through an HUD display or a side mirror display. Alternatively, the display controller may operate a vibration motor mounted in a handle to generate warning vibration.

The steering controller may perform a control for a motor driving power steering (MDPS) system driving a steering wheel. For example, when collision of the vehicle is expected, the steering controller may control a steering of the vehicle in a direction in which the collision may be avoided or a damage may be minimized.

The driving controller may perform deceleration, acceleration, on/off of an engine to drive the vehicle. For example, the driving controller may perform deceleration when collision is expected at the time of driving the vehicle, and perform on/off of the engine at the start or end of the driving of the vehicle according to the control command of the controller 200.

The brake controller may control whether to operate a brake of the vehicle, and control a pedal effort of the brake. For example, when front collision is expected, the brake controller may perform a control to automatically operate an emergency brake according to the control command of the controller 200 regardless of whether or not the driver operates the brake.

Meanwhile, hereinabove, the processors, the ECUs, and the controllers are described as independent components with reference to the accompanying drawings, but it is to be understood that the present disclosure is not necessarily limited thereto. Two or more processors may be integrated as one processor and may work in conjunction with each other, two or more processors and an ECU may be integrated as one device, two or more controllers may be integrated as one controller and may work in conjunction with each other, two or more controllers and an ECU may be integrated as one device.

Figure 2:
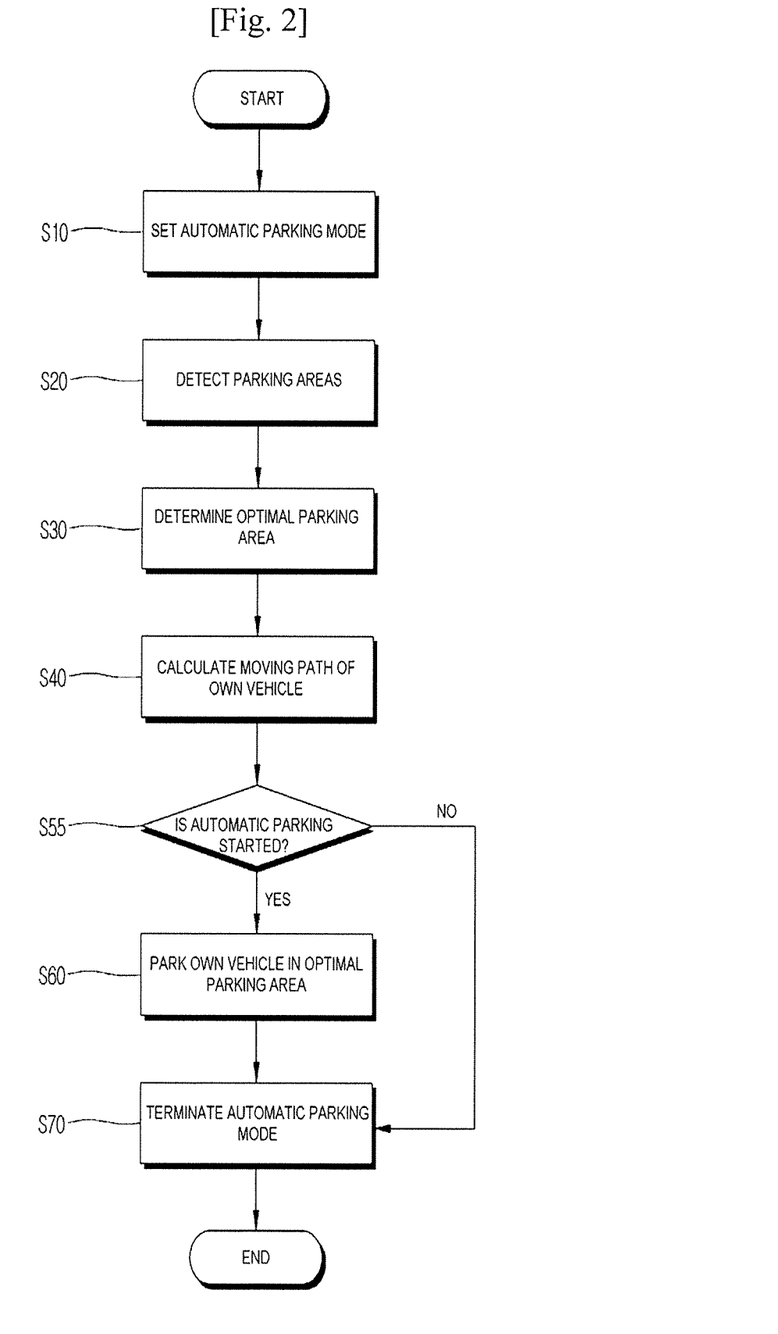
FIG. 2 is a flowchart showing a sequence of an automatic parking method according to an exemplary embodiment of the present disclosure.

FIG. 2 is a flowchart showing a sequence of an automatic parking method according to an exemplary embodiment of the present disclosure. The automatic parking system according to an exemplary embodiment of the present disclosure means a partially automated parking system (PAPS).

Referring to FIG. 2, the driver may set an automatic parking mode provided in the vehicle. By setting the automatic parking mode, a vehicle mode may be changed from a standby mode to an active mode in which automatic parking may be performed. A method of setting the automatic parking mode may include a first type method in which the driver executes the automatic parking mode while sitting on a driver's seat, and a second type method in which the driver executes the automatic parking mode outside the vehicle or while sitting on a seat other than the driver's seat by using a remote controller (S10).

The sensor unit may sense the surrounding area of the subject vehicle to calculate a plurality of parking areas in which the subject vehicle may be parked. The sensor unit may sense parking lines, curbs disposed near the parking lines, an empty space between surrounding vehicles, etc. At this point, the controller may calculate parking areas by considering a length and a width of the subject vehicle (S20).

The controller may display to the driver data on the calculated parking areas through the display controller. The driver may select a parking area that is determined as an optimal parking area through a display device or a separate switch in the vehicle (the first type method), or may select a parking area that is determined as an optimal parking area by using a remote controller (the second type method). At this point, the controller may recommend to the driver a parking area that is determined as an optimal parking area among the parking areas (S30).

When an optimal parking area is determined, the controller may calculate a moving path between a current position and the optimal parking area (S40).

The controller may drive the subject vehicle based on the moving path. The controller may automatically drive the subject vehicle, and control the steering controller, the driving controller, the brake controller, and the gear controller. At this point, the controller may control the subject vehicle at a speed of less than 10 km/h, and control deceleration or acceleration of the vehicle, gear change, braking and parking braking, etc. The sensor unit may sense a distance from an obstacle during automatic parking of the subject vehicle, and the controller may determine possibility of collision based on the distance between the subject vehicle and the obstacle and inform the driver of the determined possibility. The sensor unit may include at least one of a camera device capable of sensing a distance between the subject vehicle and an obstacle, a Lidar device, and a radar device. The driver may select whether to perform automatic parking. When the driver executes the automatic parking, the controller may automatically control the subject vehicle to park the subject vehicle in an optimal parking area, and when the driver does not execute the automatic parking, the driver may directly park the subject vehicle in the optimal parking area. If the driver turns off an execution switch of the automatic parking mode or shift the gear to parking (P) during the automatic parking, the subject vehicle may stop. At this point, the controller may request the driver to select whether to maintain the automatic parking mode through the display controller.

Based on an intention of the driver, the automatic parking mode may be executed again or terminated. Further, when the gear is shifted to another gear other than parking (P) during the automatic parking, and when the steering is changed to a predetermined degree or more, the vehicle may stop. For example, steering change of a predetermined degree may mean a case in which about 5 Nm of torque is applied to the steering wheel.

At this point, the controller may request the driver to select whether to maintain the automatic parking mode through the display controller. Based on an intention of the driver, the automatic parking mode may be executed again or terminated. Further, when the braking is performed to a predetermined degree or more during the automatic parking, the controller may determine that the braking of the driver should be preferentially performed, rather than application of the automatic parking system. That is, the subject vehicle may stop by the brake (S55 and S60).

In addition, the automatic parking mode may be terminated following the intention of the driver. The driver may turn off the execution switch of the automatic parking mode (the first type) or cancel the execution of the automatic parking mode by using the remote controller (the second type) (S70).

Figure 3:
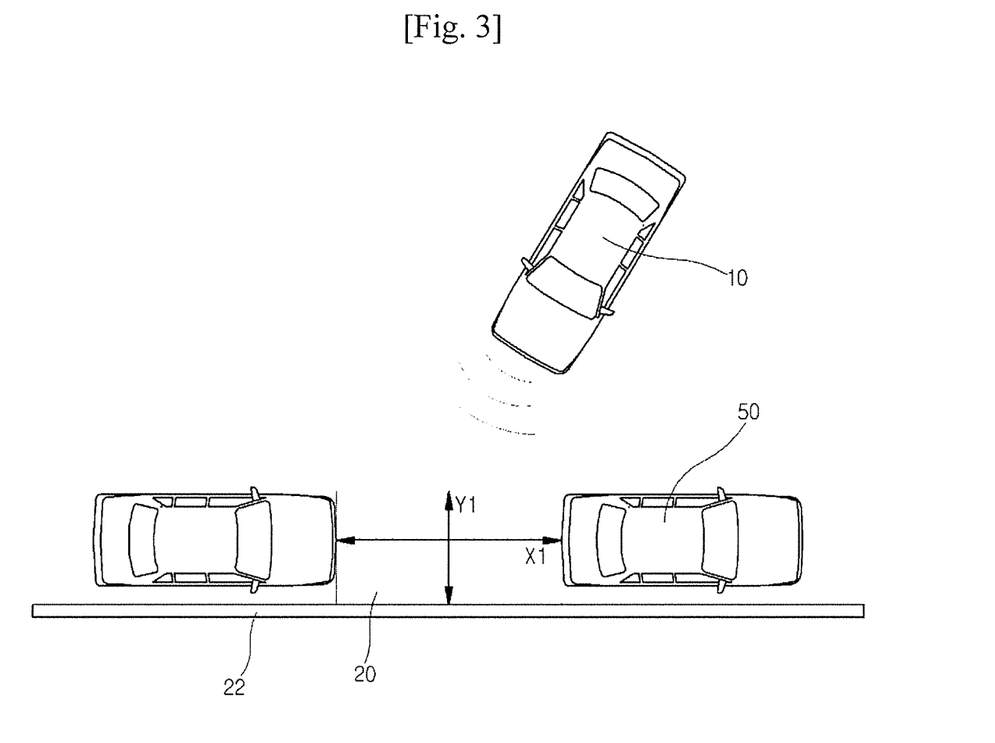
FIG. 3 is a diagram showing a parking area at the time of parallel parking according to an exemplary embodiment of the present disclosure.
Figure 4:
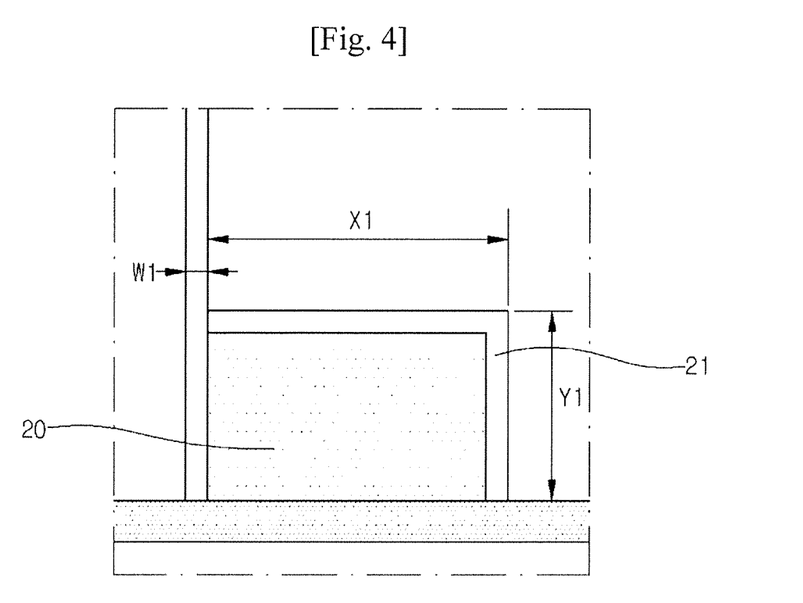
FIG. 4 is a diagram showing a parking area in a case in which there is a parking line at the time of parallel parking according to an exemplary embodiment of the present disclosure.

FIG. 3 is a diagram showing a parking area at the time of parallel parking according to an exemplary embodiment of the present disclosure, and FIG. 4 is a diagram showing a parking area in a case in which there is a parking line at the time of parallel parking according to an exemplary embodiment of the present disclosure.

Referring to FIGS. 3 and 4, it is possible to detect parking areas in which parallel parking may be made through the sensor unit attached to a subject vehicle 10. The sensor unit may detect a parking line 21, a curb 22 disposed around parking areas, and a space between surrounding vehicles 50, and the controller may calculate parking areas by calculating whether the spaces are a space in which the subject vehicle 10 may be parked based on such information. The controller may calculate an optimal parking area 20 that is most suitable for parking among parking areas. The controller may select an optimal parking area 20 by considering a length and a width of the subject vehicle 10.

Referring to FIG. 3, the controller may calculate the optimal parking area 20 by calculating a space between surrounding vehicles 50. The curb 22 may assist in defining a space between surrounding vehicles 50. Further, the sensor unit may sense an alignment line of the surrounding vehicles 50 parked in parallel to assist in calculating the optimal parking area 20. The optimal parking area 20 may have a length X1 extending in a direction in which the surrounding vehicles 50 are parked, and a width Y1 extending in a direction perpendicular to that of the length X1. The length X1 may be a value obtained by adding a length of the subject vehicle 10 and first room (+a), and the width Y1 may be a value obtained by adding a width of the subject vehicle 10 and second room (+b). For example, when the length of the subject vehicle 10 is short (4 m or less), the first room (+a) may satisfy +a=4 m×0.25 when the length of the subject vehicle 10 is long (6 m or more), the first room (+a) may satisfy +a=6 m×0.25, and the second room (+b) may be 0.2 m. That is, the controller may calculate the optimal parking area 20 by considering the length and the width of the subject vehicle 10.

Referring to FIG. 4, the sensor unit may sense the parking line 21, and the controller may determine whether the subject vehicle 10 may be parked by calculating a length X1 and a width Y1 of the parking line 21. The parking line 21 may have a contrast range of at least 5. The parking line 21 may have a constant width W1, and the controller may determine whether it is an optimal parking area 20 by considering the length X1, the width Y1, and the width W1 of the parking line 21.

Figure 5:
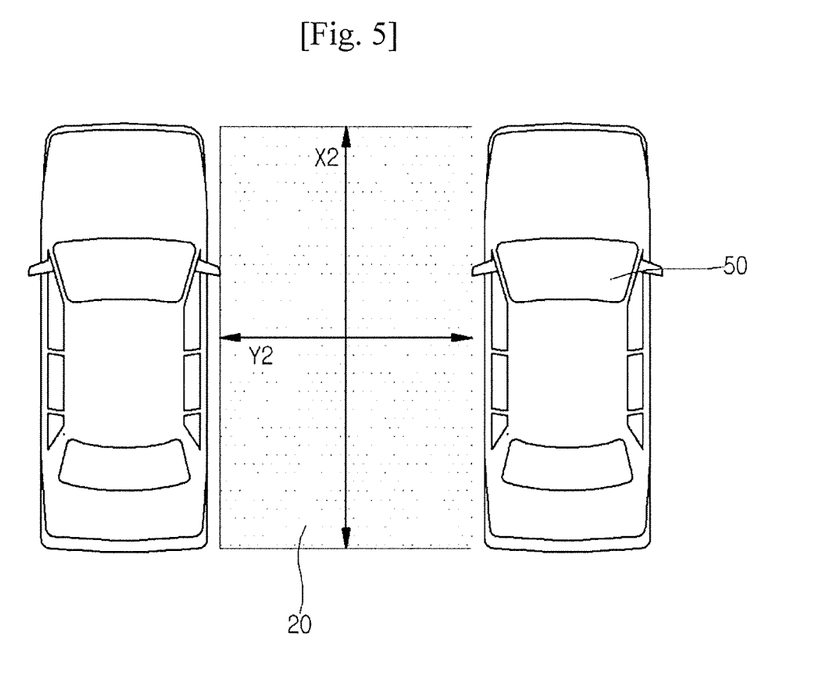
FIG. 5 is a diagram showing a parking area at the time of perpendicular parking according to an exemplary embodiment of the present disclosure.
Figure 6:
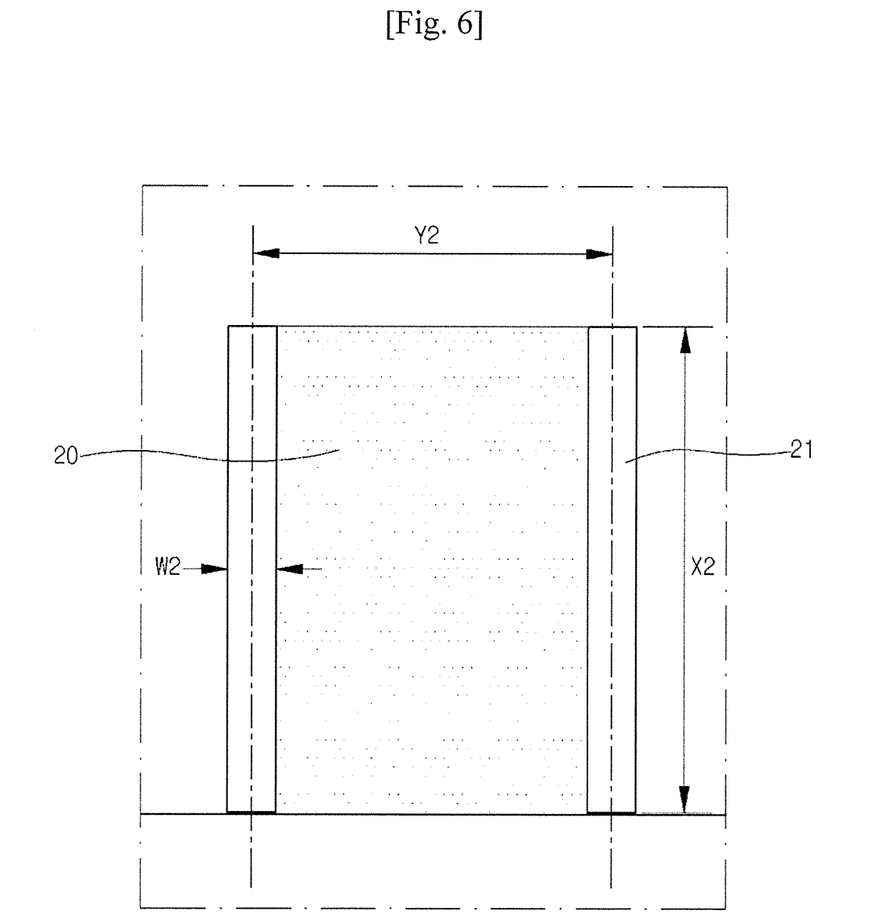
FIG. 6 is a diagram showing a parking area in a case in which there is a parking line at the time of perpendicular parking according to an exemplary embodiment of the present disclosure.

FIG. 5 is a diagram showing a parking area at the time of perpendicular parking according to an exemplary embodiment of the present disclosure, and FIG. 6 is a diagram showing a parking area in a case in which there is a parking line at the time of perpendicular parking according to an exemplary embodiment of the present disclosure.

Referring to FIGS. 5 and 6, it is possible to detect parking areas in which perpendicular parking may be made through the sensor unit attached to the subject vehicle. The sensor unit may detect a parking line 21 and a space between surrounding vehicles 50, and the controller may calculate parking areas by calculating whether the spaces are a space in which the subject vehicle may be parked based on such information.

Referring to FIG. 5, the controller may calculate the optimal parking area 20 by calculating a space between surrounding vehicles 50. The optimal parking area 20 may have a width Y2 extending in a direction in which the surrounding vehicles 50 are parked, and a length X2 extending in a direction perpendicular to that of the width Y2. The length X2 may be similar to the length of the subject vehicle, and the width Y2 may correspond to a value obtained by adding the width of the subject vehicle and third room (+c). For example, the third room (+c) may be 1.2 m.

Referring to FIG. 6, the sensor unit may sense the parking line 21, and the controller may determine whether the subject vehicle 10 may be parked by calculating a length X2 and a width Y2 of the parking line 21. The parking line 21 may have a contrast range of at least 5. The parking line 21 may have a constant width W2, and the controller may determine whether it is an optimal parking area 20 by considering the length X2, the width Y2, and the width W2 of the parking line 21. For example, when the subject vehicle is a large vehicle, the length X2 may be longer than the length of the subject vehicle by 1.0 m, and the width Y2 may be longer than the width of the subject vehicle by 0.06 m. That is, the controller may calculate the optimal parking area 20 by considering the length and the width of the subject vehicle 10.

Figure 7:
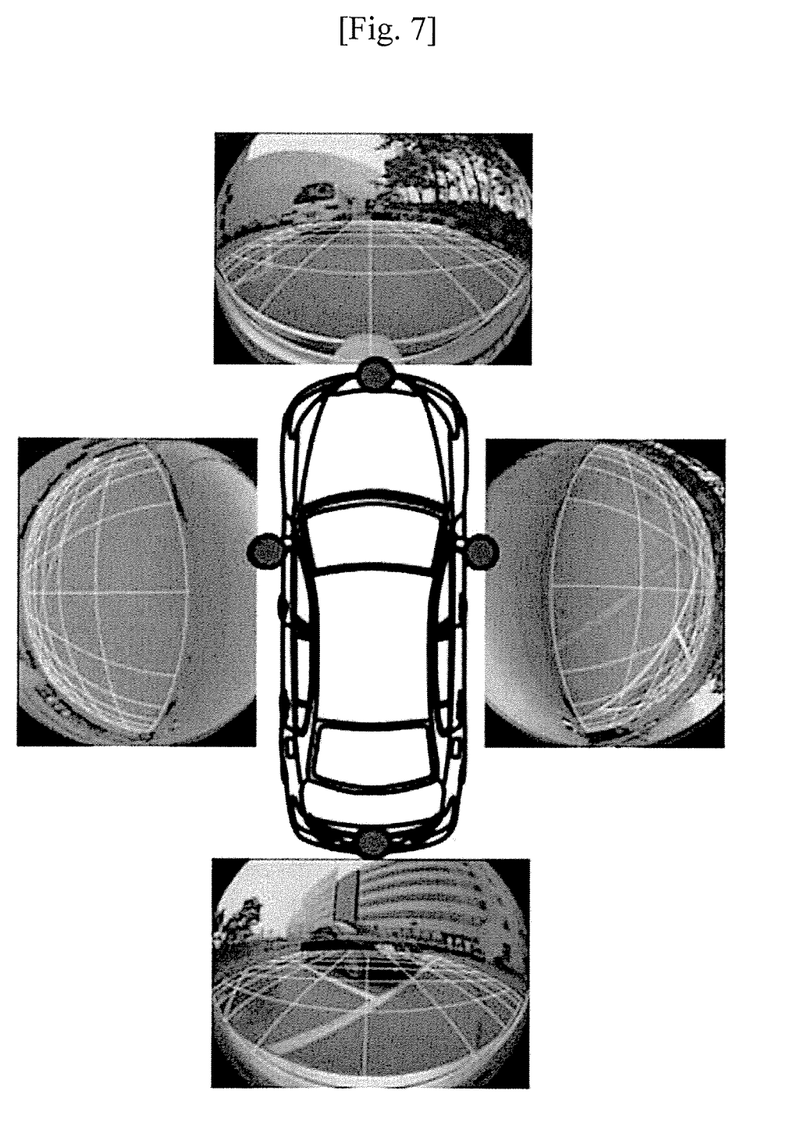
FIG. 7 is a diagram showing an image of a top view format obtained by being converted and synthesized by virtual camera modeling according to an exemplary embodiment of the present disclosure.

FIG. 7 is a diagram showing an image of a top view format obtained by converting and synthesizing using a virtual camera modeling according to an embodiment of the present disclosure.

Referring to FIGS. 1 and 7, when the camera processor 110 is implemented as the AVM, the images around the subject vehicle may be photographed 360° in all directions with respect to the subject vehicle. The virtual camera modeling is performed by the parking space recognizing sensor 150 or the controller 200 (which may be included in the AVM) photographed through the AVM, and as a result, may be converted into the external image that is a two-dimensional (2D) Image. In this case, the external image may be a top view, that is, a Bird's Eye view image, such as looking at the vehicle from the top of the subject vehicle.

FIGS. 8 to 11 are diagrams showing a step of recognizing a parking area of a parking space recognizing sensor according to an embodiment of the present disclosure.

Referring to FIGS. 1 and 8 to 11, a corner detection technology for comparing two consecutive images to recognize parking areas can be used. The corner detection technology, which is a technology of recognizing an image by extracting corners of objects included in the image, is generally used in order to determine a difference between the consecutive images. Particularly, in the image processing and recognizing fields, the corner information becomes an important reference point in fields such as shape and tracking, and therefore the present disclosure may use the corner detection as described above to recognize the images around the consecutively photographed top view type vehicle, thereby extracting main feature points. Among the corner detection technologies as described above, the most representative Harris corner detection technology may be used. However, the corner detection technology may not be limited thereto.

Figure 8:
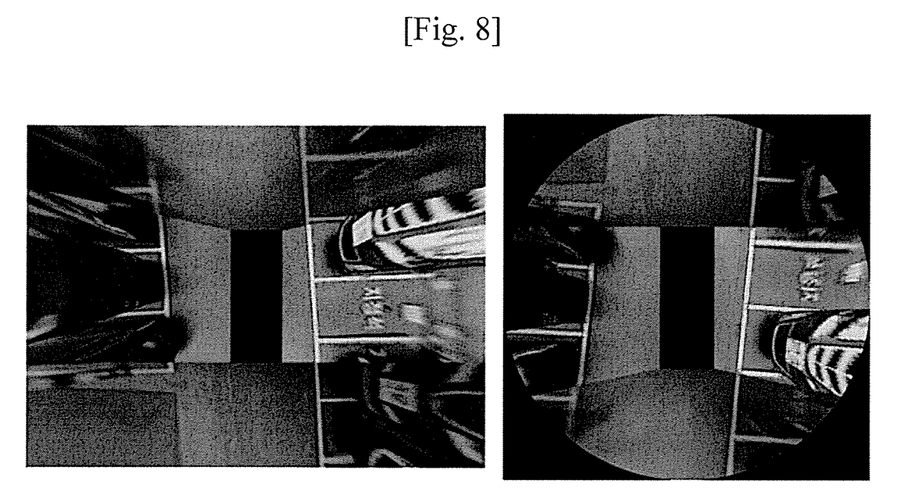
FIGS. 8 to 11 are diagrams showing a process of recognizing a parking area of a parking space recognizing sensor according to an exemplary embodiment of the present disclosure.
Figure 9:
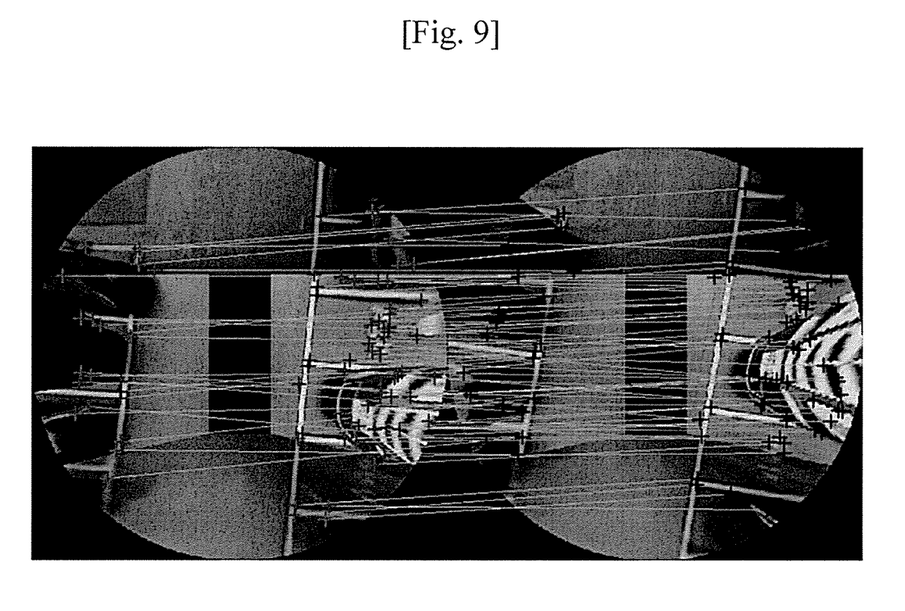

When the main feature points of two consecutive images are extracted, the controller 200 may match and compare the feature points of the two consecutive images. Normalized cross correlation (NCC) technology may be used to match the feature points of the two consecutive images. The NCC technology is a technology for normalizing two images so that the two images are compared with each other. The controller 200 may use the NCC technology to normalize and compare the two consecutive images that vary depending on the movement of the vehicle. At this point, the controller 200 may use brightness values of 7×7 square area pixels around the feature points of the two consecutive images as descriptors of the feature points, normalize them using the NCC technology to match each feature point with each other, and measure similarity.

Figure 10:
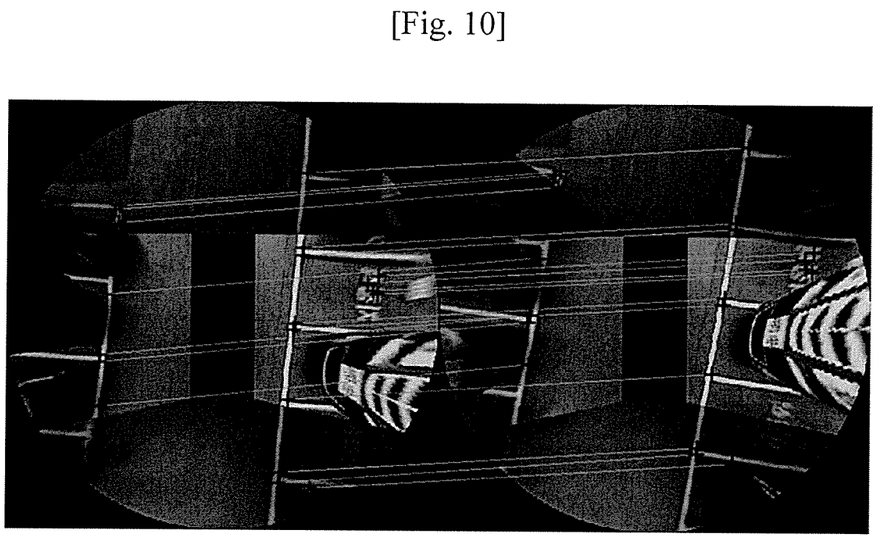
Figure 11:
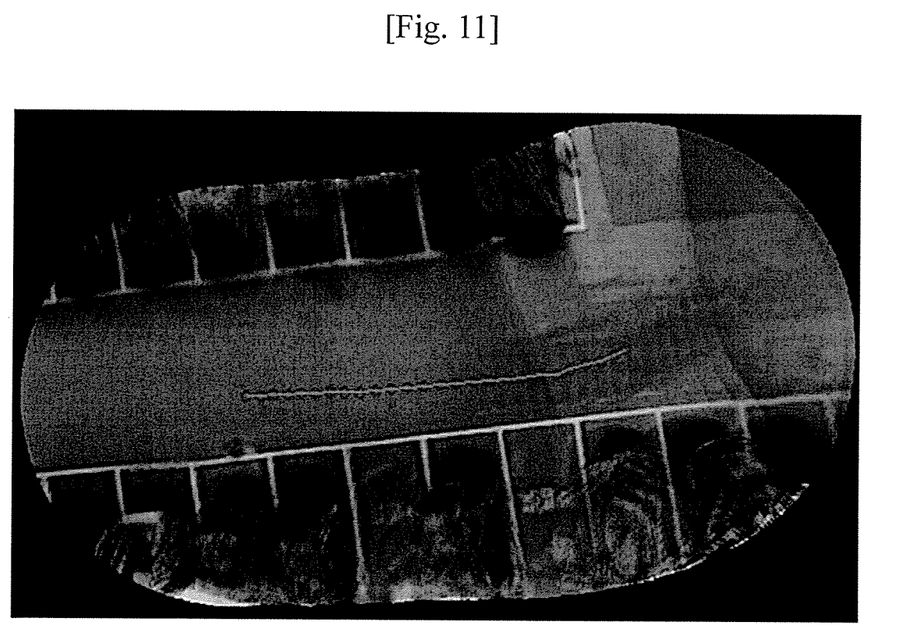

As described above, when the respective feature points of the two consecutive images normalized are matched with each other, as illustrated in FIG. 10, the step of deleting the mismatched feature points is performed. At this point, the step of deleting the mismatched feature points is performed to extract an angular difference between the two consecutive images using a similarity transformation model and compare only valid feature points using a random sample consensus (RANSAC) technology displacement difference. The RANSAC technology is a well-known technology of predicting factors of a mathematical model from a series of data sets including false information (mismatched feature points in the embodiment of the present disclosure) by a repetitive operation. The controller 200 may recognize the mismatched feature points using the RANSAC technology and delete them. If the mismatched feature points are deleted as described above and the valid feature points are selected, as illustrated in FIG. 11, the step of matching the images based on the estimated valid feature points is performed. That is, the movement trajectory of the vehicle may be recognized and the position of the vehicle may be estimated, by continuously performing the steps of FIGS. 8 to 10 and continuously matching the consecutive images according to the movement of the vehicle.

Figure 12:
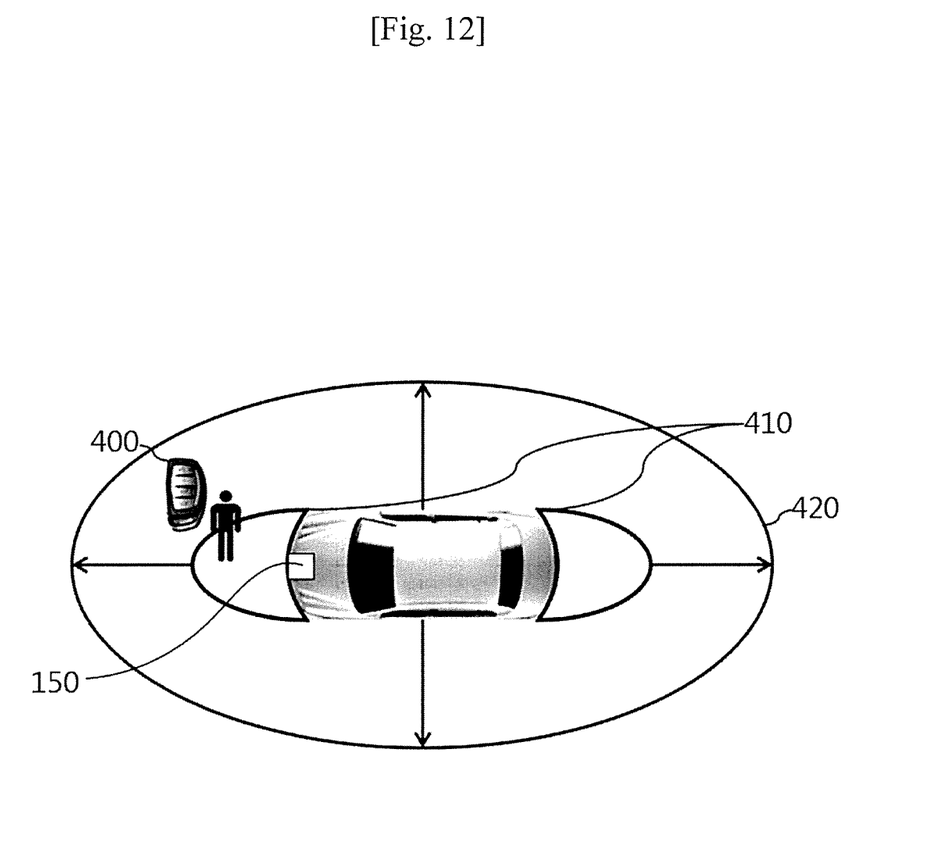
FIG. 12 is a diagram showing recognition of a smart key by a subject vehicle according to an exemplary embodiment of the present disclosure.

FIG. 12 is a diagram showing recognition of a smart key by a subject vehicle according to an exemplary embodiment of the present disclosure.

Referring to FIGS. 1 to 12, the smart key recognition processor 150 installed in the vehicle may recognize a smart key 400 positioned in a first area 410. The smart key recognition processor 150 may perform wireless communication with the smart key 400, and receive a signal from the smart key 400 to transmit the received signal to the controller 200. The controller 200 may perform vehicle door control, start control, driving control, parking control, and the like. That is, the driver may remotely control the vehicle using the smart key 400. The smart key recognition processor 150 may include a wireless receiver for receiving a start signal of the vehicle, and check whether a password that may included in the start signal matches to make the vehicle starts.

The smart key 400 may include a button for start, and a button for performing the automatic parking mode. The driver may control the start of the vehicle through on/off of the start button. Further, the driver may execute the automatic parking mode by operating the automatic parking mode button to be in an on state, or terminate the automatic parking mode by operating the button to be in an off state.

The first area 410 and a second area 420 may be defined according to a used frequency and purpose of the smart key recognition processor 150 and the smart key 400. The first area 410 may be defined as an area in which the smart key recognition processor 150 may recognize the smart key 400. The second area 420 may be defined as an area in which when the smart key 400 transmits a first signal, the vehicle may receive the first signal. When the driver pushes the start button of the smart key 400, the smart key 400 may transmit a start signal (first signal) to the vehicle by using ultra high frequency (UHF) of 300 to 3000 MHz.

For example, when the smart key 400 transmits a signal for activating start of the vehicle outside the 30-meter radius from the vehicle, the vehicle may not receive the signal for activating start of the vehicle. Meanwhile, if the vehicle may receive a signal transmitted by the smart key 400 within the 30-meter radius from the vehicle, the second area 420 may be defined as having a 30-meter radius.

The first area 410 may be an area in which the smart key recognition processor 150 installed in the vehicle may recognize a driver carrying the smart key 400. The driver may activate remote parking control by pushing the automatic parking button of the smart key 400 in the first area 410, and the controller 200 performs authentication for determining whether to perform parking control with respect to a person positioned in the first area 410 before activating the remote parking control. After the authentication is completed, the controller 200 then may activate the sensor unit 100 and prompt the driver to set the automatic parking mode.

When the start of the vehicle is activated, the vehicle may periodically (e.g., 480 msec) generate a signal (second signal) for authentication. The smart key 400 may receive the second signal, and transmit a third signal including authentication information to the vehicle in response to the second signal. The vehicle receives the third signal including the authentication information to authenticate the smart key 400 transmitting the third signal through password processing.

As an example, when the start of the vehicle is activated, the vehicle may transmit the second signal to the smart key 400 by using long frequency (LF) of 30 to 300 kHz. In this case, the first area 410 is an area in which the smart key 400 may receive the second signal. Thereafter, the smart key 400 may transmit the third signal including authentication information in response to the second signal. For example, if the vehicle transmits the second signal using 124 kHz frequency when the smart key 400 is in an area outside the 3 or 5-meter radius from the vehicle, the smart key 400 may not receive the second signal. Meanwhile, if the smart key 400 is positioned within the 3 to 5-meter radius from the vehicle, the smart key 400 may receive the second signal, and in this case, the first area 410 may be defined as having a 4-meter radius.

Figure 13:
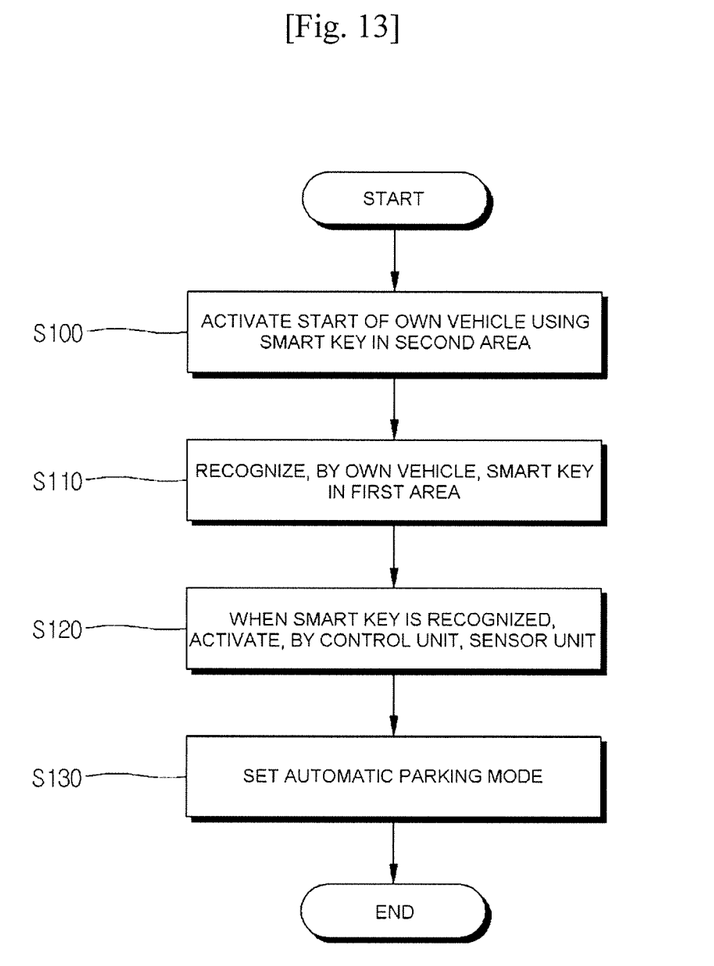
FIG. 13 is a flowchart showing a setting of an automatic parking mode using a smart key according to an exemplary embodiment of the present disclosure.

FIG. 13 is a flowchart showing a setting of an automatic parking mode using a smart key according to an exemplary embodiment of the present disclosure.

Referring to FIG. 13, the driver may activate a start of the vehicle through the smart key in the second area. The smart key transmits a first signal for activating the start of the vehicle to the vehicle, and the vehicle may receive the first signal to activate the start of the vehicle (S100). After activating the start of the vehicle, the smart key recognition processor of the vehicle may sense whether the smart key is positioned within the first area. The smart key recognition processor transmits a second signal, and the smart key that received the second signal transmits a third signal including authentication information, such that the vehicle may recognize the smart key (S110) When the smart key recognition processor recognizes the smart key, the controller may activate the sensor unit. Then, the controller may prompt the driver to set whether to perform the automatic parking mode (S120). The driver may perform the automatic parking mode by using the smart key outside the vehicle or on a seat other than the driver's seat (S130). Processes after setting the automatic parking mode may be the same as FIG. 2.

According to the exemplary embodiment of the present disclosure, it is possible to provide the automatic parking system capable of setting an optimal parking area among parking areas to automatically perform parking from a current position of a subject vehicle to the optimal parking area.

According to the embodiment of the present disclosure, the images around the vehicle may be acquired using the AVM system and converted into the top view image, thereby recognizing the situations around the vehicle in real time and recognizing the parking space in any direction around the vehicle.

According to the embodiment of the present disclosure, the images around the vehicle may be continuously photographed to be registered, and consecutive images may be compared with each other to perform the parking space and the parking line to show the path through which the vehicle passes and display the optimal parking space, thereby improving the reliability of parking and the accuracy. Further, it is possible to improve the stability of the parking assistance system by providing the top view based image to the driver and visualizing the parking process.

According to the exemplary embodiment of the present disclosure, parking may be easily performed since it is possible to park a vehicle without getting on the vehicle in the case in which the vehicle is parked in a narrow parking space using the smart key. Further, an inexperienced driver poor at parking may easily perform parking.

Meanwhile, it is to be understood that a partially automated parking system (PAPS) is described in the present specification by way of example for convenience of explanation. As described above, the PAPS is merely one of several advanced driving assistance system (ADAS) functions, and it is to be understood that implementation of the PAPS suggested in the present disclosure may also be used for implementation of other relevant ADAS functions. For example, the method suggested in the present disclosure may also be used to implement one function or a combination of a plurality of functions ADAS functions such as a PAPS, a land departure warning system (LDWS), a lane keeping assistance system (LKAS), a pedestrian detection and collision mitigation system (PDCMS), a forward vehicle collision warning system (FVCWS), a low speed following (LSF), a maneuvering aids for low speed operation (MALSO) and an extended range backing aid (ERBA), etc.

In one or more exemplary embodiment of the present disclosure, the described functions may be implemented by hardware, software, firmware, or a combination thereof. In a case of implementation as software, the functions may be stored in or transmitted to a computer-readable medium as one or more commands or codes. The computer-readable medium includes all communication medium and computer storage medium including any medium facilitating transmission of a computer program from one place to another place. The storage medium may be any available medium that is accessible by a computer. As a non-limitative example, the computer-readable medium may include a RAM, a ROM, an EEPROM, a CD-ROM, or other optical disc storage, a magnetic disc storage or other magnetic storage device, or any other medium that may be used to transfer or store a desired program code in a form of a command or a data structure and is accessible by a computer. Further, an arbitrary connection is appropriately referred to as a computer-readable medium. For example, when software is transmitted from a website, a server, or other remote source by using a coaxial cable, an optical fiber cable, a twisted-pair cable, a digital subscriber line (DSL), or wireless technologies such as infrared, radio, and ultra high frequency, the coaxial cable, the optical fiber cable, the twisted-pair cable, the DSL, or the wireless technologies such as infrared, radio, and ultra high frequency are included in definition of the medium. The disk and disc as used herein includes a compact disc, a laser disc, an optical disc, a digital versatile disc (DVD), a floppy disc, and a Blu-ray disc, and disks generally magnetically reproduce data, but discs optically reproduces data by laser. The above combinations also should be included in a range of the computer-readable medium.

When the exemplary embodiments are implemented by a program code or code segments, it is to be recognized that the code segment may represent a procedure, a function, a sub-program, a program, a routine, a sub-routine, a module, a software package, a class, or any combination of commands, data structures, or program instructions. The code segment may be connected to another code segment or a hardware circuit by transferring and/or receiving information, data, an argument, a parameter, or memory contents. The information, the argument, the parameter, the data, and the like may be transferred, sent, or transmitted by using any appropriate means including memory share, message transmission, token transmission, network transmission, etc. In addition, in some aspects, steps and/or operations of a method or an algorithm may reside as one of codes and/or commands or any combination or a set thereof on a machine-readable medium and/or a computer-readable medium that may be integrated as a computer program object.

In the implementation as software, technologies described herein may be implemented by modules (e.g., procedure, function, etc.) performing the functions described herein. The software codes may be stored in memory units and may be executed by processors. A memory unit may be implemented in a processor or outside the processor, and in this case, the memory unit may be connected to the processor in a manner that the memory unit may perform communication with the processor by various means as known in the art.

In implementation as hardware, processing units may be implemented by one or more of an application specific integrated chip (ASIC), a digital signal processor (DSP), a digital signal processing device (DSPD), a programmable logic device (PLD), a field programmable gate array (FPGA), a processor, a controller, a microcontroller, a microprocessor, and other electronic units designed to perform the functions described herein, or in a combination thereof.

The above description includes an example of one or more exemplary embodiments. It is apparent that those skilled in the art may recognize that every possible combinations of components or method may not be described for explanation of the above described exemplary embodiments, but additional combination and substitution of various exemplary embodiments may be possible. Therefore, the described exemplary embodiments include all alternatives, changes, and modifications within the spirit and scope of the accompanying claims. Furthermore, regarding a range in which a term "comprising" is used in the detailed description or claims, the term is included similarly to a term "be configured" as interpreted when the term "be configured" is used as a transitional word in the claims.

As used herein, a term "inferring" or "inference" generally refers to a process of determining or inferring a state of a system, an environment, and/or a user based on observation of one set captured by events and/or data. The inference may be used to identify a specific situation or operation, or may generate probability distribution with respect to, for example, states. The inference may be probabilistic, that is, may be calculation of probability distribution with respect to corresponding states based on consideration of data and events. The inference may also refer to technologies used to configure upper level events from one set of events and/or data. Such inference enables estimation of new events or operations from one set of observed events and/or stored event data, whether events are closely related in time, and whether events and data come from one or several events and data sources.

Furthermore, as used in the present application, terms "component", "module", "system", and the like include, but not limited to, hardware, firmware, a combination of hardware and software, software, or a computer-related entity such as software being executed. For example, a component may be, not limited to, a process performed on a processor, a processor, an object, executable execution thread, a program, and/or a computer. For example, both of an application driven by an operational device and the operational device may be a component. One or more components may reside in a process and/or execution thread, and a component may be concentrated on one computer, and/or dispersed between two or more computers. Further, these components may be executed from various computer-readable medium storing various data structures. Components may perform communication by a local and/or remote process such as according to a signal having one or more data packets (for example, data from any component interacting with other components of a local system and distribution system and/or other systems by a signal through a network like Internet).

What is claimed is:

1. An automatic parking system, comprising:
   a smart key recognition processor recognizing a smart key positioned in a first area and initiating an automatic parking mode upon recognition of the smart key;
   a sensor unit acquiring images of an area surrounding a subject vehicle upon initiating of the automatic parking mode, and converting the acquired images into external images and synthesizing the external images;
   a parking space recognizing sensor periodically receiving the external images and sequentially comparing consecutive external images using an image recognition technology to recognize parking areas; and
   a controller calculating, a moving path between a current position of the subject vehicle and an optimal parking area among the parking areas and controlling the subject vehicle based on the moving path,
   wherein the parking space recognizing sensor detects the parking areas in consideration of a length and a width of the subject vehicle,
   wherein a length of the optimal parking area is determined based on the length of the subject vehicle and a width of the optimal parking area is determined based on the width of the subject vehicle.

2. The automatic parking system of claim 1, wherein the parking space recognizing sensor extracts feature points of the consecutive images using the image recognition technology, matches the feature points of two consecutive images, deletes mismatched feature points, and matches valid feature points to recognize the parking areas.

3. The automatic parking system of claim 1, wherein the controller controls the subject vehicle to prevent the subject vehicle from colliding with obstacles using data acquired by the sensor processor and the camera processor, while the subject vehicle moves along the moving path.

4. The automatic parking system of claim 1, wherein the smart key performs an automatic parking mode control to perform a start control and an automatic parking of the subject vehicle within a second area, and
   the second area is an area larger than the first area.

5. The automatic parking system of claim 4, wherein the automatic parking mode is released by using the smart key.

6. The automatic parking system of claim 1, wherein the sensor unit detects surrounding parking around the optimal parking area and a parking line.

7. The automatic parking system of claim 1, further comprising:
   a display controller informing a driver of the parking areas,
   wherein the controller controls the vehicle to be driven in the optimal parking area selected by the driver.

8. The automatic parking system of claim 1, wherein the controller controls steering, acceleration, brake, gear shift, and parking brake of the subject vehicle.

9. The automatic parking system of claim 1, wherein the external images are top view images of the subject vehicle viewed from a top of the subject vehicle.

10. An automatic parking method for automatically parking a subject vehicle, the automatic parking method comprising:
    activating an automatic parking mode upon recognizing a smart key positioned in a first area;
    obtaining images of an area surrounding the subject vehicle upon recognition of the smart key, and converting the acquired images into external images and synthesizing the external images;
    detecting parking areas using the external images around the subject vehicle and a length and a width of the subject vehicle;
    selecting an optimal parking area among the parking areas; and
    automatically parking the subject vehicle in the optimal parking area,
    wherein in the detecting of the parking areas, the parking areas are recognized by sequentially comparing consecutive external images using an image recognition technology,
    wherein a length of the optimal parking area is determined based on the length of the subject vehicle and a width of the optimal parking area is determined based on the width of the subject vehicle.

11. The automatic parking method of claim 10, further comprising:
    terminating the automatic parking mode, after the automatically parking of the subject vehicle,
    wherein the terminating of the automatic parking mode is performed by turning off an automatic parking mode switch or shifting a gear to parking.

12. The automatic parking method of claim 10, wherein in the automatically parking of the subject vehicle, when an automatic parking mode switch is turned off or a gear is shifted to parking, the automatic parking mode is terminated.

13. The automatic parking method of claim 10, further comprising:
    terminating the automatic parking mode, after the automatically parking of the subject vehicle,
    wherein when a button of the smart key is in an on state, the subject vehicle is automatically parked, and when the button of the smart key is in an off state, the automatic parking mode is terminated.

14. The automatic parking method of claim 10, wherein in the automatically parking of the subject vehicle, when any one of gear shift, steering change, and brake operation is performed, the automatic parking mode is stopped.

15. The automatic parking method of claim 10, wherein the detecting of the parking areas includes:
    extracting feature points of the consecutive external images using the image recognition technology;
    deleting mismatched feature points by matching the feature points of two consecutive images; and
    matching images based on valid feature points.

* * * * *